INVENTORS
JAMES W. LIGHT
HOWARD M. GEYER

Willits, Hardman and Fehr
THEIR ATTORNEYS

Aug. 9, 1955     J. W. LIGHT ET AL     2,715,206
SYNCHRONIZING APPARATUS

Filed Nov. 23, 1951     2 Sheets-Sheet 2

INVENTORS
JAMES W. LIGHT
HOWARD M. GEYER
Willite, Hardman and Fehr
THEIR ATTORNEYS.

2,715,206

SYNCHRONIZING APPARATUS

James W. Light, Greenville, and Howard M. Geyer, Dayton, Ohio, assignors to General Motors Corporation, Detroit, Mich., a corporation of Delaware Application November 23, 1951, Serial No. 257,871

9 Claims. (Cl. 322—36)

The present invention relates to coincident operation of two rotary prime mover variable load combinations and particularly to the synchronous operation of two engine-propeller combinations in an aircraft.

One of our objects is to provide a simple and inexpensive electrical means to synchronize the operation of a "slave" engine-propeller combination with the operation of a "master" engine-propeller combination operating at a selected speed. We accomplish this object by providing each engine-propeller, or rotary prime mover variable load, combination with a means for producing an alternating current frequency proportional to rotary speed. The "slave" engine-propeller combination is further provided with a means for adjusting the load in response to the difference betwen the frequencies of the alternating currents produced by the two engine-propeller combinations. This is accomplished by the inclusion of a phase-sensitive circuit comprising three double-winding electromagnetic relays, and a three-phase motor energized by the circuits completed upon actuation of these relays, to adjust the load of the "slave" engine-propeller combination to bring the speed of this combination into synchronism with that of the "master" engine-propeller combination. The speed of the "master" prime mover is adapted to be manually adjusted, and the synchronizer system automatically brings the "slave" prime mover into synchronism with the "master" prime mover.

Specifically, the aforementioned object is accomplished by connecting one phase of a three-phase alternator driven by the "master" prime mover to three serially connected windings of the three double-winding relays. The three phases of the alternator driven by the "slave" prime mover are connected to the other three windings of the three relays, respectively, so that these windings will be energized in a definite order, and at a rate determined by the speed of the prime mover driven alternator. The movable armatures of the double-winding electromagnetic relays are so constructed that they will move only during coincident energization of both windings of their respective relays. These relays are connected so as to energize the three coils of a three-phase motor used to adjust the load of the "slave" prime mover.

When the "slave" and "master" prime movers are operating in synchronism, only one of the relays will be intermittently energized, and as this only intermittently energizes one of the phases of the follow-up motor, the motor does not rotate and the "slave" prime mover load remains at a fixed magnitude. When the speeds of the "master" and "slave" prime movers are different, the relays will be energized in sequence either 1, 2, 3 or 3, 2, 1, the sequence depending on whether the "slave" prime mover is rotating at a lesser or greater speed than the "master" prime mover. Consequently, energization of the relays energizes the three phases of the follow-up motor in sequence, thus causing its armature to rotate to readjust the magnitude of the load on the "slave" prime mover so that the speeds of the "master" and "slave" prime movers will again be in synchronism.

Further objects and advantages of the present invention will be apparent from the following description, reference being had to the accompanying drawings wherein a preferred embodiment of the present invention is clearly shown.

Figure 1:
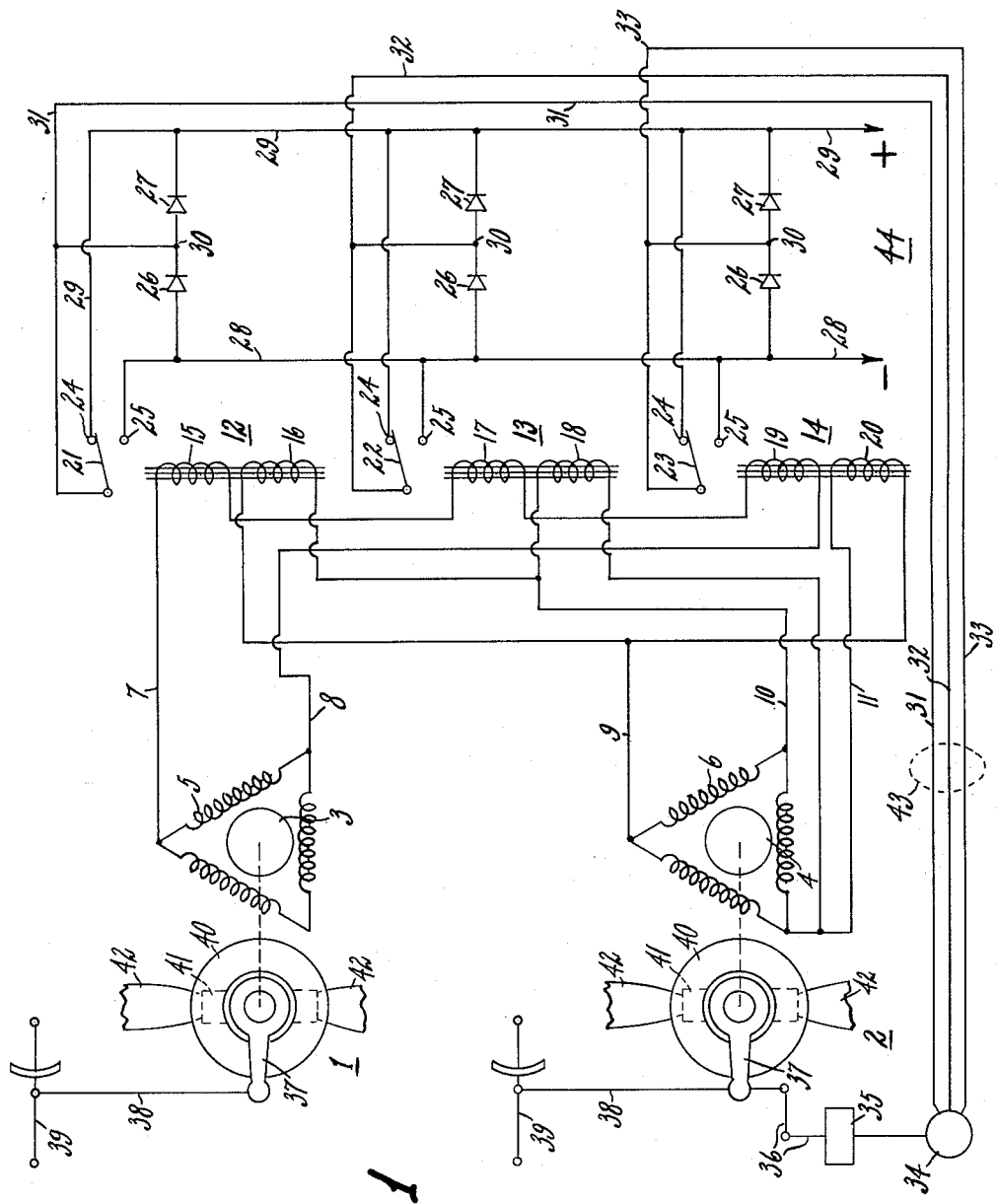
Fig. 1 represents a circuit diagram of our invention.

Referring more particularly to Fig. 1 of the drawings, the reference numeral 1 designates generally a "master" engine-propeller combination whose speed will be used as the reference speed. The numeral 2 designates generally a "slave" engine-propeller combination which is to be synchronized with the reference speed of engine 1. Each of these engines has an adjustable pitch propeller including a plurality of blades 42, shiftable in propeller hubs 41, each of which is fitted with a regulator 40 for controlling the pitch of its associated propeller blades, such as is shown in U. S. patents to Blanchard et al. 2,307,101 and 2,307,102. The regulators 40 are controlled by an arm 37 and associated linkage which in each case may include a pilot's control lever 39 and associated link arm 38. Manual movement of the lever 39 operates on control arm 37 through linkage 38 to manually control the pitch of the associated propeller. The "master" engine-propeller combination has associated therewith a three-phase alternator including a rotor 3 and a stator 5, and the "slave" engine-propeller combination likewise has associated therewith a three-phase alternator including a rotor 4 and stator 6. These two alternators are of the conventional type in which the rotation of the rotor produces a three-phase output signal, one phase across each of the windings and spaced 120 electrical degrees apart. In the instant case, a single phase from the "master" engine-propeller combination alternator is impressed by means of conductors 7 and 8 on three serially connected windings, 15, 17 and 19 of three double-winding electromagnetic relays 12, 13 and 14. Each of the three phases of the alternator driven by the "slave" engine-propeller combination are individually connected by means of conductors 9, 10 and 11 to separate windings 16, 18 and 20, respectively, of the three electromagnetic relays. Under such a circuit arrangement each of the windings 15, 17 and 19 has an alternating voltage simultaneously impressed thereon at intervals of 360 electrical degrees, as determined by the "master" engine-driven alternator. Each of the windings 16, 18 and 20 has an alternating voltage impressed thereon in sequence at intervals of 120 electrical degrees, as determined by the "slave" engine-driven alternator.

Each of the three relays 12, 13 and 14 has associated therewith a movable armature 21, 22 and 23, respectively. When the windings of the associated relays are de-energized, the armatures 21, 22 and 23 are in contact with stationary contacts 24 which are connected by means of conductor 29 to the positive terminal of a D. C. power supply 44. Stationary relay contacts 25 are connected by means of conductor 28 to the negative terminal of power supply 44. The D. C. power supply 44 is connected in parallel across three pairs of series connected rectifiers 26 and 27 by means of conductors 28 and 29. The rectifiers 26 and 27 are merely used for arc suppression to protect the relay contacts during contact engaging movements of the armatures 21, 22 and 23. Each of these three pairs of rectifiers are center-tapped at 30 to the movable armature contacts of the relays. The movable contact armatures 21, 22 and 23 are connected to the three windings of a reversible stepping motor 34 by means of conductors 31, 32 and 33, respectively, these three conductors being carried in a cable designated generally as 43. The motor 34 actuates the regulator arm 37 of "slave" engine-propeller combination 2 through reduction gear 35 and linkage 36.

The operation of the synchronizing system described above is as follows: the pilot's controls 39 for both engines are adjusted so that the engines are operating at approximately the same rotational speed. At this point, the synchronizing system becomes effective and the "slave" engine is then controlled by adjusting the speed of the "master" engine. Under these conditions "master" engine 1, by means of its three-phase alternator 5, simultaneously energizes windings 15, 17 and 19 of relays 12, 13 and 14 at intervals of 360 electrical degrees, and "slave" engine 2, by means of its three-phase alternator 6, energizes relay windings 16, 18 and 20 of the relays in sequence 120 electrical degrees apart. The movable armature contacts of the relays will be actuated only when both windings of their associated relays are coincidentally energized by substantially the maximum, or peak, voltages of the alternator signals. Thus it may be said that the two windings of each relay are arranged in voltage assisting relation. The direction of motor field rotation and rotor rotation depends on the sequence of coincident relay energization. Hence, the wiring is made so that the relays are actuated in the proper sequence to increase pitch when the "slave" engine is overspeed and to decrease pitch when the "slave" engine is under speed.

Figure 2:
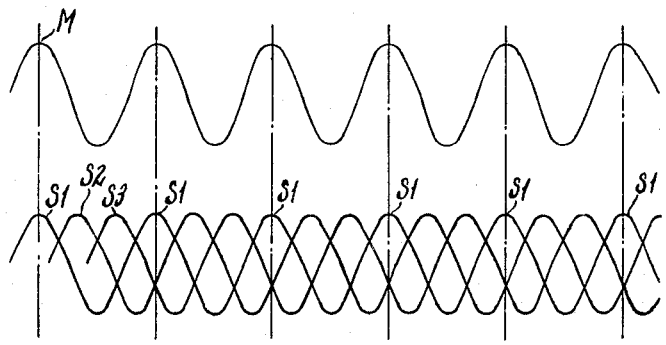
Fig. 2 shows the relationships of the various signals when the prime movers are rotating in synchronism.
Figure 3:
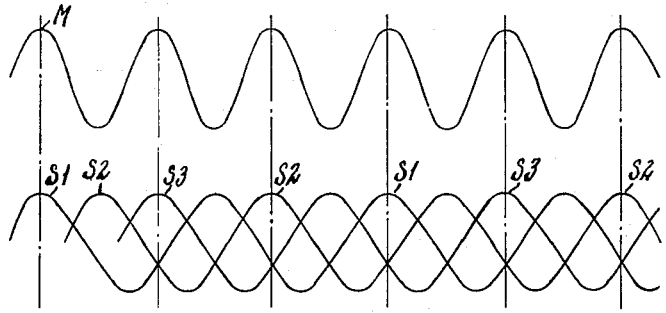
Fig. 3 shows the relationships of the various signals when the "slave" engine is rotating at a speed slower than the "master" engine.
Figure 4:
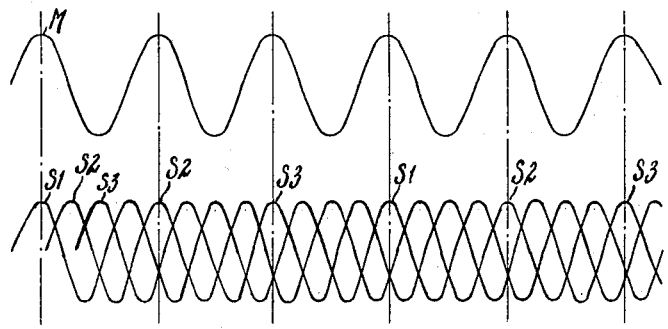
Fig. 4 shows the relationships of the various signals when the "slave" engine is rotating at a speed faster than the "master" engine.

When the engines are operating at synchronous speed both windings of only one relay will be simultaneously energized, causing a pulse of current in one of the windings of the follow-up motor each 360° of alternator armature rotation. Thus, the follow-up motor will not have a rotating field, but a stationary field and therefore its rotor will remain stationary. The relationships of the various signals under synchronous conditions are diagrammatically shown in Fig. 2 wherein a single phase M of the "master" alternator coincides with only one phase S1 of the three phases S1, S2, S3 of the "slave" alternator, at intervals of 360 electrical degrees. If, on the other hand, the "slave" engine 2 is rotating slower than the "master" engine 1, the energization of windings 15, 17 and 19 of the relays may first coincide with the energization of winding 20 of relay 14. The energization of windings 15, 17 and 19 will next coincide with energization of winding 18 of relay 13 and following this, the energization of windings 15, 17 and 19 will coincide with energization of winding 16 of relay 12. This sequence of coincident energization of the relay windings will continue and hence the relays will operate in sequence 14, 13, 12 and repeat, to energize the "slave" engine pitch control motor windings to create a rotating field in motor 34 to decrease the pitch of the propeller of engine 2, thereby allowing this engine to increase its speed to a speed synchronous with that of the "master" engine. The relationships of the various signals when the "slave" engine is rotating slower than the "master" engine are diagrammatically shown in Fig. 3, wherein the single phase M of the "master" alternator sequentially coincides with the three phases S1, S2, S3 of the "slave" alternator in the order S3, S2, S1. If the opposite conditions are true, viz. the speed of the "slave" engine 2 being faster than that of the "master" engine 1, the relays will be energized in the sequence 12, 13, 14 and repeat, thereby causing the rotor of motor 34 to rotate in the opposite direction to increase the pitch of the propeller of the "slave" engine, and allowing this engine to slow down to synchronism with the "master" engine. The relationships of the various signals when the "slave" engine is rotating faster than the "master" engine are diagrammatically shown in Fig. 4 wherein the single phase M of the "master" alternator sequentially coincides with the phases S1, S2, S3 of the "slave" alternator in the order S1, S2, S3.

While the embodiment of the present invention as herein disclosed constitutes a preferred form, it is to be understood that other forms might be adopted.

What is claimed is as follows:

1. In apparatus for controlling the synchronous operation of a plurality of rotating elements, the combination including, manually operated means for selecting the desired speed level, electric adjusting means operable on the manually operated selecting means of one element for matching that element operation with the operation of another element as a reference speed source, said electric means including a multi-phase alternator driven at a speed proportional to the element speed, a plurality of double winding electromagnetic relays, the windings of each relay being arranged in voltage assisting relation, one winding of each of said relays being individually energized by a respective phase of said alternator, and means energizing the other winding of each of said electromagnetic relays with a common reference signal derived from said reference speed source, said relays being actuated by the coincidence of said two signals in said windings to cause actuation of the adjusting means for said manually operated means.

2. Apparatus for controlling the synchronous operation of a plurality of prime movers including, means providing variable load combinations for each prime mover, a multi-phase signal generator driven by one of said prime movers, a single-phase signal generator driven by a second prime mover, a plurality of double-winding electromagnetic relays equal in number to the number of phases of said multi-phase signal generator, the windings of each relay being arranged in voltage assisting relation, means energizing one winding of each of said relays, respectively, with a phase from said multi-phase generator, means energizing the other winding of each of said relays simultaneously from said single-phase signal generator, and adjusting means controlled by the sequence of relay actuation operable to vary the load on one of said prime movers in response to coincident energization of both windings of said relays so as to cause synchronous operation of said prime movers.

3. Apparatus for controlling the synchronous operation of a plurality of rotating elements including, a multi-phase signal generator driven by one of the elements, a single-phase signal generator driven by a second element, a plurality of double-winding electromagnetic relays equal in number to the number of phases of said multi-phase signal source, the windings of each relay being arranged in voltage assisting relation, means energizing one winding of each of said relays respectively with a phase from said multi-phase signal generator, means energizing the other windings of all of said relays simultaneously from said single-phase generator, and adjusting means controlled by the sequence of relay operation caused by coincident energization of both windings of said relays operable to vary the rotative speed of one of said elements so as to cause synchronous operation of said elements.

4. The combination set forth in claim 3 wherein the means controlled by the sequence of relay operation includes a reversible stepping motor.

5. Apparatus for controlling the synchronous operation of a plurality of rotating elements including, a pair of multi-phase signal generators driven by said elements, a plurality of double-winding electromagnetic relays equal in number to the number of phases of said multi-phase signal sources, the windings of each relay being arranged in voltage assisting relation, means energizing one winding of each of said relays, respectively, with a phase from one of said multi-phase signal sources, means energizing the other windings of all said relays simultaneously from a single phase of the other multi-phase signal sources, said other windings being serially connected, and adjusting means controlled by the sequence of relay operation caused by coincident energization of both windings of said relays operable to vary the rotative speed of one of said elements so as to cause synchronous operation of said elements.

6. Apparatus for controlling the synchronous operation of a plurality of rotating elements including, a plurality of multi-phase alternators driven by said elements, a plurality of double-winding electromagnetic relays equal in number to the number of phases of said multi-phase signal sources, the windings of each relay being arranged in voltage assisting relation, one winding of each of said relays being individually energized by a respective phase of one of said multi-phase sources, means simultaneously energizing the other windings of said relays from a single phase of another of said multi-phase sources, and adjusting means controlled by the sequence of relay operation caused by coincident energization of both windings of said relays operable to vary the rotative speed of one of said elements to cause synchronous operation of said elements.

7. Apparatus for controlling the operation of a prime mover including, means providing a variable load combination for said prime mover, a multi-phase signal generator driven by said prime mover, a second multi-phase generator driven by a reference speed source, a plurality of double winding electromagnetic relays equal in number to the number of phases of said multi-phase signal generators, the windings of each relay being arranged in voltage assisting relation, means energizing one winding of each of said relays, respectively, with a separate phase from said prime mover driven multi-phase generator, means energizing the other winding of each of said relays simultaneously from a single phase of the other of said multi-phase generators, and adjusting means controlled by the sequence of relay operation caused by coincident energization of both windings of said relays operable to vary the load on said prime mover.

8. Apparatus for controlling the operating speed of a rotating element having speed controlling means including, in combination, a reference speed source, a multi-phase signal generator operatively connected to and driven at a speed proportional to the speed of said rotating element, a plurality of double winding electromagnetic relays, the windings of each relay being arranged in voltage assisting relation, one winding of each relay being individually energized by a respective phase of said signal generator, means energizing the other winding of each relay with a common reference signal derived from said reference speed source, said relays being constructed and arranged so as to be actuated only by the coincidence of the two signals in their respective windings, and means controlled by the sequence of relay actuation operable to adjust the speed controlling means of said rotating element.

9. The combination set forth in claim 8 wherein the adjusting means include, an independent power circuit controlled by the energization of said relays, and a reversible electric motor energized by said independent power circuit and controlled by the sequence of relay energization.

References Cited in the file of this patent

UNITED STATES PATENTS

| | | |
|---|---|---|
| 1,428,507 | Sperry | Sept. 5, 1922 |
| 1,519,675 | Ford | Dec. 16, 1924 |
| 2,249,029 | Mullerheim | July 15, 1941 |
| 2,302,042 | Martin | Nov. 17, 1942 |
| 2,433,432 | Chillson et al. | Dec. 29, 1947 |
| 2,482,812 | Treseder | Sept. 27, 1949 |
| 2,517,703 | Offner | Aug. 8, 1950 |